3,505,421
PROCESS OF HYDROGENATING BENZENE
Daniel Lumbroso, Le Vesinet, Quang Dang Vu, Paris, and Robert Odello, Montesson, France, assignors to Institut Francais du Petrole des Carburant et Lubrifiants, Malmaison, Hauts-de-Seine, France
Filed Mar. 21, 1968, Ser. No. 714,935
Claims priority, application France, Mar. 24, 1967, 100,361; Apr. 25, 1967, 104,182
Int. Cl. C07c 5/10, 13/18, 1/00
U.S. Cl. 260—667    20 Claims

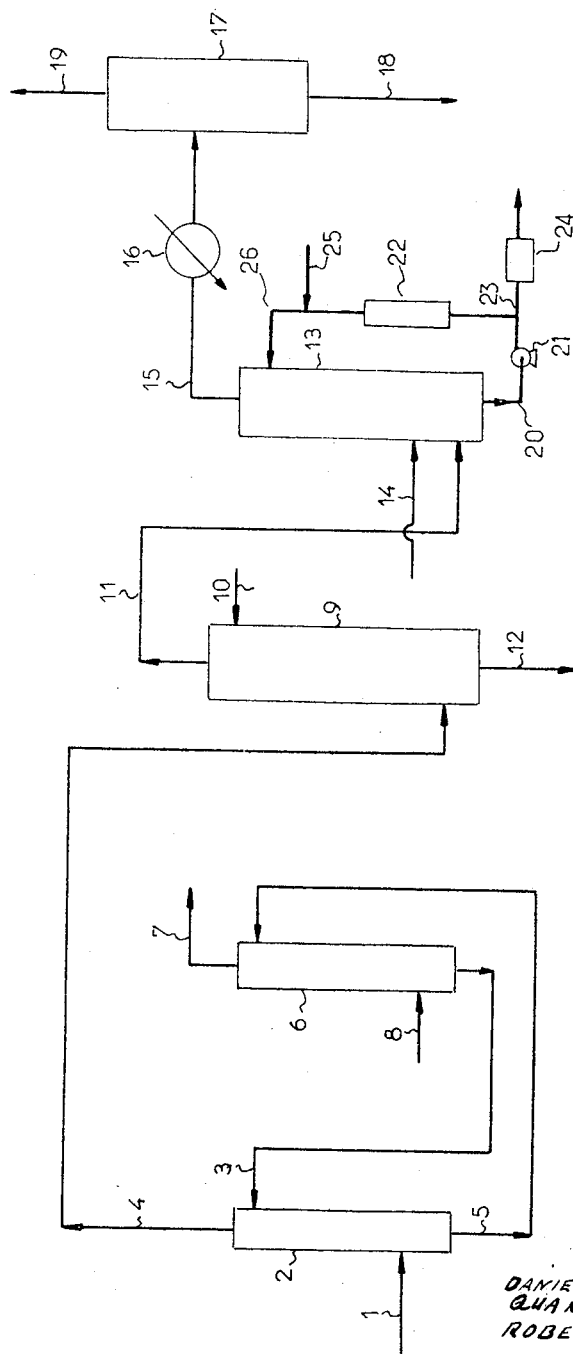

ABSTRACT OF THE DISCLOSURE

This invention is drawn to benzene hydrogenation to form cyclohexane in the liquid phase using molecular hydrogen and a suspension of a solid catalyst which is injected incrementally based on the catalyst density in the liquid phase.

---

This invention relates to hydrogenation of benzene in the liquid phase in the presence of a suspended solid catalyst, for example Raney nickel in powder form. An advantageous form of the latter is obtained by making Raney nickel passive by use for instance of the process described in the French Patent 1,430,888 filed on June 13, 1964. The so-"passivated" obtained catalyst is introduced into the hydrogenation reaction vessel, the operating conditions being such that it recovers all its activity as the reaction vessel is in operation.

The operation of a hydrogenation unit is generally as follows:

The reaction vessel is filled with cyclohexane and charged with the catalyst and then the temperature and pressure are adjusted to the operating conditions and the injection of benzene and hydrogen-containing gas is started. Cyclohexane is recovered either from the liquid phase or, preferably by condensation of the gaseous outflow from the reaction vessel, or by both ways.

The continuous conversion of benzene takes place over a duration which depends on various factors such as the sulphur content of the charges. After a certain time the conversion rate decreases and, when the catalyst is deactivated, the unit must be stopped in order to discharge the old catalyst and the above-stated operation is recommenced.

This manner of operating suffers from the double drawback of requiring periodical interruptions of the operation and relatively high catalyst consumptions.

The reaction vessel is usually not fed with pure hydrogen but with a gaseous mixture of high hydrogen content, which mixture also contains other compounds, for instance nitrogen and also such impurities as hydrocarbons having five or more carbon atoms per molecule. These hydrocarbons are troublesome since they often form azeotropes with cyclohexane. It is therefore necessary to purify the hydrogenating mixture by removing such noxious compounds therefrom.

The conventional purification processes consist of contacting the hydrogenating mixture with an oil or a cut of heavy hydrocarbons (having for instance more than 10 carbon atoms per molecule). By this way impurities are removed, but there is introduced, through the hydrogenating gaseous mixture, absorption oil into the cyclohexane.

The introduced amount is very small, of the order of a few tens of parts per million of parts, the vapor pressure of said absorption oil being very low, but still too high with respect to the tolerable amount in industrial cyclohexane; moreover said oil is adsorbed more particularly on the catalyst, thereby reducing its activity.

It is the main object of the invention, on one hand to extend the interval between two successive stops of the installation or even to completely suppress such stops and, on the other hand to substantially reduce the catalyst consumption.

Another object of this invention is to provide for a particular process of purifying the hydrogenating gas, which does not suffer from the above-stated inconveniences.

These various objects are achieved by the process according to the invention.

The invention relates to a process of hydrogenating benzene to cyclohexane in the liquid phase, by means of a gas containing molecular hydrogen, in the presence of a suspended solid hydrogenation catalyst, characterized in that, during the initial operating period, only a relatively small amount of catalyst is used, and thereafter such a complementary amount of the hydrogenating catalyst is introduced as to reach a maximal value of the catalyst density in the liquid phase, the catalyst injection being thereafter continued, continuously or by steps while withdrawing, continuously or by steps, the catalyst, in amounts substantially equal to those introduced in the liquid phase.

The process may be carried out in the following manner:

The reaction vessel filled with liquid cyclohexane, when starting the operation, up to the convenient level, is brought to the temperature and pressure conditions selected for the reaction; the injection of the hydrogenating gas is then effected and the catalyst is inroduced either pure, i.e. in a solid state, or in the form of a suspension into a liquid which may be cyclohexane, for instance through a lock chamber or by means of a suitable pump. Although it is preferred to inject the gases before injecting the catalyst, the reverse order of introduction may also be used.

Thereafter the benzene is injected (although according to a modified embodiment benzene can be present in small amount when the gas or the catalyst is injected).

The conversion of benzene is observed periodically or continuously.

As soon as the conversion rate falls below a predetermined level, a new amount of catalyst is introduced into the reaction vessel and so on. It is also possible to inject fresh catalyst in a continuous manner.

When the density of the catalyst in the liquid cyclohexane reaches a convenient value hereafter called maximal amount, there is withdrawn a part of the liquid cyclohexane with the catalyst suspended thereinto, which is separated for instance by decantation or filtration, the withdrawn cyclohexane being recycled. This operation can be also achieved with the use of a lock chamber. Such operations of withdrawal of the used catalyst are preferably carried out without stopping the operation of the unit, although non-necessarily.

Although the process may use a high starting amount of catalyst, it is preferred to start the operation with an initial catalyst amount of from 1 to 40% of the so-called maximal amount subsequently present in the reaction vessel.

The operating conditions for hydrogenating benzene in the liquid phase are well known and need not be stated here. In general the temperature is comprised between 125 and 275° C., preferably between 170 and 230° C. and the pressure is such as to maintain a liquid phase, generally within the range of from 5 to 100 atmospheres.

As catalyst, there may be used any solid compound having a hydrogenating catalytic activity, more particularly a metal from the group VIII of the periodical classification of elements the most preferred one being nickel. This metal may be deposited on a carrier. Of course the support, after impregnation and division into small particles, will be suspended into the liquid phase in which is injected the hydrogenating gas.

The different aforementioned factors, i.e. particularly the maximal amount of catalyst present in the reaction vessel, the rate of fresh catalyst injections and the amounts of injected catalyst, may be varied and it is thus difficult to state precise values thereof.

These various factors depend in fact on such operating conditions as temperature, pressure and desired conversion rate of benzene. As a matter of fact, when hydrogenation of benzene is carried out in two stages (as it is often the case), the first stage can be conducted in the liquid phase with the catalyst suspended thereinto and the second stage in the vapor phase in the presence of a fixed bed catalyst. It is then possible to limit the conversion rate in the first stage to a relatively low value of, for instance 95 to 99%. This results practically from the use of high benzene feeding rates and/or low catalyst amounts, or from an extended period of use of a partially deactivated catalyst, which presents an obvious economical advantage.

On the contrary, when the hydrogenation is carried out in a single stage, the conversion rate is substantially equal to 100%, the amount of benzene in the outflow from the reaction vessel being equal to no more than a few hundreds or tens of parts per million of parts by weight of cyclohexane.

Generally the maximal amount of catalyst in suspension in the liquid phase will be comprised between 1 and 50% and preferably between 5 and 30% by weight of catalyst per weight of liquid (the catalyst being expressed in metal).

By liquid phase there is meant the assembly of cyclohexane and benzene. By way of example, there can be maintained in the liquid phase, at least during the ten first hours of the reaction (for example during from 10 to 500 hours) a catalyst concentration comprised between 0.1 and 10% by weight with respect to the liquid phase, and preferably of from 0.3 to 3%. This concentration can be increased and at least doubled thereafter, so as to reach the aforementioned maximal concentrations.

The liquid phase subjected to hydrogenation can contain only a small proportion of benzene, for example lower than $1/1000$ (and in particular comprised between $1/100000$ and $1/1000$) by weight, according to the technique described in the French patent application No. 30,478 filed in the name of the present applicant, on Sept. 4, 1965. It is obvious however that there can be used a higher benzene concentration. Moreover the hydrogen will be advantageously used in excess to the stoichiometrical amount. An improvement of this technique consists of carrying out purification in two stages (or in a single stage) of the gaseous mixture prior to its use for hydrogenating benzene.

In a first stage (in the case of a two-stage process) the hydrogenating gaseous mixture is contacted, preferably counter-currently, with a liquid compound capable of absorbing the hydrocarbons containing five or more carbon atoms in their molecule.

In a second stage, the hydrogenating gaseous mixture obtained from the first stage is contacted with cyclohexane so as to retain the vapors or droplets of the absorbing liquid carried along with the gaseous mixture during the first stage. By this way the resulting hydrogenating mixture is free from the troublesome hydrocarbons without being contaminated by any extraneous compound. In fact, after said second stage, the purified hydrogenating mixture has been slightly enriched in cyclohexane, this compound being in any way present in the hydrogenation reaction vessel as the product of the hydrogenation reaction.

Of course, the gaseous mixture may be directly contacted with the cyclohexane without preliminary contact with the oil (this is the case when using a single stage process). However this manner of operation is less advantageous since it results in a higher cyclohexane consumption. Moreover, with the two-stage purification process there may be used in the first stage a comparatively lighter oil (a more volatile one) than that used in a conventional process.

The accompanying drawing shows a unit for hydrogenation of benzene using a two-stage purification. A number of modified embodiments can be conceived without departing from the spirit of this invention.

There is introduced, through duct 1 into the vessel 2, the hydrogenating gaseous mixture. In this vessel is effected the contact between the gaseous mixture and the absorbing oil, introduced through duct 3. From duct 4, there is obtained a gas free from pentane and heavier hydrocarbons initially present therein. From duct 5 is withdrawn the used oil which is conveyed to the vessel 6 where the oil, charged with hydrocarbons is regenerated, for example by means of a steam current introduced through duct 8.

At the top of vessel 6, the products absorbed by the oil are eliminated through duct 7, while the regenerated oil is recovered and recycled through duct 3 to vessel 2.

The gaseous mixture issued from vessel 2 is injected into vessel 9 where it is contacted with liquid cyclohexane introduced through duct 10. In this vessel 9, all of the oil vapors carried away are retained by the cyclohexane. The "de-oiled" gas flows out through duct 11; of course, it contains cyclohexane vapors.

Through duct 12 is withdrawn a mixture of oil and cyclohexane. The amount of cyclohexane flowing out through duct 12, the same as that introduced through duct 10, generally does not exceed 0.5% of the cyclohexane amount produced by the synthesis, which makes obvious the high economic interest of this new process.

Into the hydrogenation reaction vessel 13, the liquid benzene is supplied through duct 14 and the hydrogenating gaseous mixture through duct 11. The reaction vessel 13 is operated in the liquid phase and in the presence of a suspended catalyst, for instance Raney nickel.

At the top of 13 the reaction products as well as the unconverted reactants issue in the vapor phase, through duct 15. They are cooled down in the heat exchange 16 and the condensed raw cyclohexane is recovered in the separator 17 and withdrawn through duct 18.

Through duct 19 are evacuated the residual gases. There is generally carried out a complementary treatment of this raw cyclohexane, consisting for instance in a distillation, so as to separate on one hand a very pure cyclohexane from, on the other hand, hydrocarbons of low molecular weight (having less than 5 carbon atoms per molecule) and which might be dissolved in the cyclohexane obtained in 17.

On the drawing is also shown a duct 20 for withdrawal of the liquid phase being sucked through pump 21 and forced back into the external cooler 22, the cooled liquid being fed back to the reaction vessel 13 through duct 26. Through a connecting duct 23 there can be retained a part of the liquid withdrawn through duct 20, which is conveyed to a filter 24 where the catalyst particles can be separated.

Fresh catalyst can be introduced in the reaction vessel 13, for instance through ducts 25 and 26. The cyclohexane separated in filter 24 can be used as suspension medium for the fresh catalyst introduced through duct 25.

The drawing illustrates only one particular embodiment of the invention which is by no way limitative. It must be understood that injections of fresh catalyst and withdrawal of used catalyst can be effected in any manner. Moreover the removal of part or all of the heat produced by the hydrogenation reaction may be carried out by means of a heat exchanger interior to the reaction vessel 13 or by any other equivalent device.

It can also be considered to make use of a finishing reactor for the hydrogenation reaction as previously mentioned. This reactor can be operated for instance in the vapor phase and contain a catalyst, identical or not to that of the main reactor and for instance deposited on a carrier. This finishing reactor would be placed between the main reaction vessel 13 and the condenser 16. Such a technique is described for instance in the United States Patent 3,202,723 filed on Sept. 13, 1962. According to the drawing, the hydrogenation product, i.e. cyclohexane, is extracted through duct 15 in the vapor phase. It is however obvious that a part or even the totality of the produced cyclohexane can be extracted in the form of the liquid phase through duct 23, the catalyst particles being in such a case either rejected or reintroduced in the circuit.

The following non-limitative examples illustrate the invention.

EXAMPLE 1

Into a reaction vessel of an 18 m.$^3$ capacity, there are introduced 10 m.$^3$ of cyclohexane. The pressure is brought to 40 kg./cm.$^2$ by means of a gas having a 70% hydrogen content and the temperature to 200° C.

This hydrogenating gas is obtained from a reforming unit and has been subjected to a two-stage purification by contact first with a hydrocarbon cut having an average molecular weight of 144 and then with cyclohexane.

The purified gas, free from heavy hydrocarbons, contains, besides the 70% by volume of hydrogen, 21% of methane, 6% of ethane, 2% of propane, 1% of butane and 10 parts per million of parts by volume of hydrocarbons having less than 5 carbon atoms per molecule.

This gas is injected at a rate of 5,000 m.$^3$ per hour, measured under standard temperature and pressure conditions, and there are introduced into the reaction vessel 50 kg. of powdered Raney nickel suspended into 200 liters of cyclohexane. Liquid benzene is then injected at a rate of 3 m.$^3$ per hour. This benzene contains 1 part by weight of sulphur per million of parts by weight of benzene.

The cooling of the liquid phase is achieved by circulating the liquid through a heat exchanger exterior to the reaction vessel as shown on the drawing.

The cyclohexane, carried along with the inert gases and the unreacted hydrogen, is condensed. After separation of the gaseous products from the liquid cyclohexane, it is observed that the benzene content of the product is of about 100 parts per million of parts by weight (100 p.p.m.).

After 4 days of operation, the benzene content of the withdrawn and condensed cyclohexane begins to increase up to about 1,000 p.p.m. A new charge of 50 kg. of catalyst is then injected together with 200 liters of cyclohexane without interrupting the operation of the unit; the benzene content of the produced cyclohexane immediately falls down to its initial value.

This operation can be repeated again thirty height times, i.e. a total of 40 times, without withdrawal of catalyst but a part of the liquid phase is withdrawn so that its volume in the reaction vessel remains substantially unchanged.

After the 40th injection the density in catalyst of the liquid phase attains a value which preferably must not be exceeded. From this moment, while continuing the periodical introductions of fresh catalyst, there is periodically or continuously withdrawn a part of the reaction mixture, without interrupting the operation; this part is decanted and recycled to the liquid phase at the hydrogenation stage while the catalyst separated by decantation is rejected or subjected to regeneration or treated for another use. The used catalyst can thus be withdrawn at a rate corresponding substantially to the feeding rate in fresh catalyst.

The hydrogenation operation can be continued in a practically unlimited manner.

By this way are produced about 16,000 kg. of cyclohexane per kg. of catalyst consumed, with a 350 p.p.m. benzene content.

By way of comparison, when proceeding according to the known process consisting of introducing the same total amount of catalyst at the same time, i.e. 2,000 kg. at the beginning of the operation, there are only produced 13,000 kg. of cyclohexane with a 350 p.p.m. benzene content, per kg. of catalyst.

Also by way of comparison, if Example 1 is repeated but with a feed of the reactor with a hydrogen stream only washed with a hydrocarbon cut, traces of said hydrocarbon cut are to be observed in the cyclohexane. These traces are troublesome in the subsequent stages, for instance for the manufacture of cyclohexanol and adipic acid.

EXAMPLE 2

Example 1 is repeated with an initial catalyst feed of the reactor of 500 kg., which results in the production of cyclohexane with a 10 p.p.m. benzene content. When the benzene content attains 100 p.p.m. (after 100 hours) 50 kg. of catalyst are added. This operation is repeated 29 times without any withdrawal of the used catalyst, i.e., a total of 30 times during the operating period; then the operation is continued while withdrawing the used catalyst at a rate corresponding to the feeding rate in fresh catalyst. As in the first example, the maximal proportion of catalyst present in the reaction vessel is close to 25% by weight.

There is thus produced, in a continuous manner and with a quantitative yield, a cyclohexane having a 30 p.p.m. by weight benzene content.

EXAMPLE 3

Example 1 is repeated except that the vaporized cyclohexane issued from the reaction vessel together with the inert gases and the unreacted hydrogen is conveyed to a second reaction vessel containing nickel deposited on kieselguhr pills. It has been observed that the first complementary addition of catalyst in the first reaction vessel can be effected after 6 days instead of 4 days. It is also possible to wait until 40 catalyst additions have been carried out before withdrawing some of the used catalyst.

EXAMPLE 4

Example 1 is repeated with the same proportions of a catalyst formed of particles of kieselguhr impregnated with nickel, the metal corresponding to 33% by weight of the impregnated carrier. The results are substantially unchanged as compared to Example 1.

What is claimed as this invention is:

1. A process of hydrogenating benzene to cyclohexane in the liquid phase, by means of a gas containing molecular hydrogen, in the presence of a solid hydrogenation catalyst in suspension, characterized in that, during the starting period of operation, there is used a comparatively low catalyst amount, that, thereafter, complementary amounts of hydrogenation catalyst are introduced until the density of the catalyst in the liquid phase attains a maximal value and that from this point catalyst injection is continued, continuously or by steps, while withdrawing, continuously or by steps, the catalyst in amounts substantially equal to the amounts introduced in the liquid phase.

2. A process according to claim 1 wherein the catalyst amount during the starting period corresponds to 1 to 40% of the maximal value thereof.

3. A process according to claim 1 wherein the maximal amount of catalyst, expressed in metal, is comprised between 1 and 50% by weight of the liquid phase.

4. A process according to claim 3, wherein the maximal amount of catalyst, expressed in metal, is comprised between 5 and 30% by weight of the liquid phase.

5. A process according to claim 1 wherein the catalyst is added progressively until the maximal value is attained.

6. A process according to claim 1 wherein the catalyst is progressively withdrawn.

7. A process according to claim 6 wherein the catalyst is withdrawn by withdrawing a part of the reaction mixture, separating therefrom the solid catalyst and recycling the liquid phase to the reaction vessel.

8. A process according to claim 1 wherein the catalyst concentration, during at least the 10 first hours of the reaction, is comprised between 0.1 and 10% by weight with respect to the liquid phase, this concentration being thereafter at least doubled so as to be in the range of from 1 to 50%.

9. A process according to claim 1, wherein the catalyst concentration, during the 10 first hours of operation, is comprised between 0.3 and 3% by weight with respect to the liquid phase, this concentration being thereafter at least doubled so as to be comprised between 5 and 30%.

10. A process according to claim 8 wherein the initial concentration of from 0.1 to 10% is maintained for at least 10 hours and at most 500 hours.

11. A process according to claim 1 wherein the gas containing molecular hydrogen has been preliminarily contacted with a cut of hydrocarbons containing more than 10 carbon atoms in the molecule and thereafter with liquid cyclohexane.

12. A process according to claim 1 wherein the gas containing molecular hydrogen has been preliminarily contacted with liquid cyclohexane.

13. A process according to claim 1 wherein cyclohexane is recovered, at least partly, in the vapor form.

14. A process according to claim 13 wherein the conversion rate of benzene is comprised between 95% and 99%.

15. A process according to claim 14 wherein unconverted benzene is hydrogenated in a second stage by passing the gaseous mixture issued from the first hydrogenation stage on a fixed bed hydrogenation catalyst.

16. A process according to claim 1 wherein the catalyst is a metal from group VIII of the periodical classification of elements.

17. A process according to claim 1 wherein the catalyst is Raney nickel.

18. A process according to claim 1, wherein the hydrogenation temperature is comprised between 125° and 275° C.

19. A process according to claim 1, wherein the hydrogenation pressure is comprised between 1 and 100 atmospheres.

20. A process according to claim 1 wherein the benzene content of the produced cyclohexane is measured and complementary catalyst amounts are added when said content becomes too high.

References Cited

UNITED STATES PATENTS

| | | | |
|---|---|---|---|
| 3,202,723 | 8/1965 | Thonon | 260—667 |
| 2,952,625 | 4/1961 | Grandio et al. | 260—667 |
| 3,054,833 | 9/1962 | Donaldson et al. | 260—667 |
| 3,070,640 | 12/1962 | Pfeiffer et al. | 260—667 |
| 3,428,697 | 2/1969 | Zulueta | 260—667 |

DELBERT E. GANTZ, Primary Examiner

V. O'KEEFE, Assistant Examiner